(12) United States Patent
Ku et al.

(10) Patent No.: US 10,967,369 B2
(45) Date of Patent: Apr. 6, 2021

(54) PILLAR STRUCTURE FOR BIOCHIP

(71) Applicant: MBD CO., LTD., Suwon-Si (KR)

(72) Inventors: Bo Sung Ku, Yongin-si (KR); Don Jung Lee, Yongin-si (KR)

(73) Assignee: MBD CO., LTD., Suwon-si (KR)

( * ) Notice: Subject to any disclaimer, the term of this patent is extended or adjusted under 35 U.S.C. 154(b) by 274 days.

(21) Appl. No.: 16/073,624

(22) PCT Filed: Mar. 30, 2018

(86) PCT No.: PCT/KR2018/003766
§ 371 (c)(1),
(2) Date: Jul. 27, 2018

(87) PCT Pub. No.: WO2018/216893
PCT Pub. Date: Nov. 29, 2018

(65) Prior Publication Data
US 2019/0134625 A1 May 9, 2019

(30) Foreign Application Priority Data
May 24, 2017 (KR) .......................... 10-2017-0063965

(51) Int. Cl.
*B01L 3/00* (2006.01)

(52) U.S. Cl.
CPC .......... *B01L 3/5027* (2013.01); *B01L 3/50853* (2013.01); *B01L 2200/025* (2013.01); *B01L 2200/16* (2013.01); *B01L 2300/0829* (2013.01); *B01L 2300/0848* (2013.01); *B01L 2300/0893* (2013.01); *B01L 2300/16* (2013.01)

(58) Field of Classification Search
CPC ............... B01L 3/5027; B01L 3/50853; B01L 2200/025; B01L 2200/16; B01L 2300/0829; B01L 2300/0848; B01L 2300/0893; B01L 2300/16; C12M 23/34; C12M 23/08; C12M 21/04; C12M 21/14; C12N 5/0068; C12N 2533/30; C12N 2533/10; A61K 35/12; A61L 27/3895
USPC ........................................ 435/288.5
See application file for complete search history.

(56) References Cited

U.S. PATENT DOCUMENTS

| | | | |
|---|---|---|---|
| 8,058,060 B2 * | 11/2011 | Esser ...................... | C12M 23/12 435/305.2 |
| 2007/0082390 A1 * | 4/2007 | Hastings ................ | C12M 25/14 435/305.2 |

FOREIGN PATENT DOCUMENTS

JP 11276154 A * 10/1999 ............ C12M 33/06

OTHER PUBLICATIONS

Machine English Translation Description-Matsue (Year: 1999).*

* cited by examiner

*Primary Examiner* — Michael L Hobbs
*Assistant Examiner* — Lenora A Abel
(74) *Attorney, Agent, or Firm* — Birch, Stewart, Kolasch & Birch, LLP

(57) ABSTRACT

The present invention relates to a pillar structure for a biochip and includes a substrate which has a plate-shaped structure, and pillar members, each of which has one side detachably coupled to the substrate and the other side on which a sample is disposed.

4 Claims, 7 Drawing Sheets

US 10,967,369 B2

PILLAR STRUCTURE FOR BIOCHIP

CROSS REFERENCE TO RELATED APPLICATIONS

This application is the National Phase of PCT International Application No. PCT/KR2018/003766, filed on Mar. 30, 2018, which claims priority under 35 U.S.C. 119(a) to Patent Application No. 10-2017-0063965, filed in the Republic of Korea on May 24, 2017, all of which are hereby expressly incorporated by reference into the present application.

TECHNICAL FIELD

The present invention relates to a pillar structure for a biochip, and more particularly, to a pillar structure for a biochip which has an improved structure that enables replacement of a pillar on which a sample is disposed and enables analysis of the sample without restriction on time and space.

BACKGROUND ART

A biochip is also called a biodevice and refers to a biological microchip that enables measurement and analysis of gene combinations, protein distributions, reaction aspects, and the like in a state in which samples, that is, biological fine substances such as DNA, protein, and cells are disposed on a substrate. Such a biochip is widely used in fields such as scientific technologies and researches, new medicine development processes, and clinical diagnosis.

In general, as illustrated in FIGS. 1 and 2, a biochip includes a pillar plate 10 and a well plate 20. FIG. 1 is a perspective view for explaining the biochip in the related art, and FIG. 2 is a cross-sectional view taken along line II-II in FIG. 1. As illustrated in the drawings, the pillar plate 10 of the general biochip is provided integrally with pillar portions 12 that protrude in the form of columns on one surface of a substrate 11. Meanwhile, the well plate 20 includes multiple well portions 21 that receive the pillar portions 12.

A sample is disposed on an end portion of the pillar portion 12 formed integrally with the substrate 11, and a culture solution is received in the well portion 21. In the case of the general biochip as described above, the pillar plate 10 is disposed on the well plate 20, such that the sample disposed on the pillar portion 12 may be received in the well portion 21 in which the culture solution is provided. In addition, the biochip enables the sample to be measured by a microscope through the pillar portion 12 through which light penetrates (see FIG. 2).

The general biochip illustrated in FIGS. 1 and 2 is manufactured by an injection molding method. Therefore, one surface of the substrate 11 of the pillar plate 10 is formed integrally with the pillar portions 12. Therefore, in the case of the general biochip, it is necessary to simultaneously analyze all of the samples at predetermined pillar intervals in order to analyze the samples which are biological substances disposed on the pillar portions 12. For this reason, there is a problem in that it is difficult to analyze the samples such as biological substances at different times or it is difficult to analyze the samples with a high degree of integration by collecting the particular pillar portions 12 and reducing the pillar intervals.

DISCLOSURE

Technical Problem

Accordingly, the present invention has been made in an effort to solve the aforementioned problems, and an object of the present invention is to provide a pillar structure for a biochip, in which pillar portions are easily detachable, thereby enabling analysis of samples disposed on the pillar portions without restriction on time and space.

The objects of the present invention are not limited to the aforementioned objects, and other objects, which are not mentioned above, may be clearly understood by those skilled in the art from the following descriptions.

Technical Solution

To achieve the aforementioned object, a pillar structure for a biochip according to the present invention forms a biochip for analyzing a sample, which is a biological fine substance such as a cell, together with a well plate that receives a culture solution, and the pillar structure includes: a substrate which has a plate-shaped structure; and pillar members, each of which has one side detachably coupled to the substrate and the other side on which the sample is disposed.

Each of the pillar members may include a coupling portion to be coupled to the substrate, and the coupling portions may be fitted with multiple fitting portions arranged on the substrate at predetermined intervals or the coupling portions may be attached by an adhesive layer.

Each of the fitting portions on the substrate may include multiple fitting protrusions which are arranged at intervals around an outer circumferential surface of the coupling portion so that a range of the coupling portion, which is exposed to light, is prevented from being reduced after the pillar members are coupled to the substrate.

Each of the pillar members may include a light receiving portion which the light passing through the substrate reaches, and a pair of coupling protruding portions which protrudes outward in a radial direction of the light receiving portion and is fitted into a space between a pair of adjacent fitting portions among the fitting portions.

A width of an inlet of the space, where each of the coupling protruding portions enters, may be smaller than a maximum outer diameter of the coupling protruding portion, and a width at a center of the space after each of the coupling protruding portions enters may correspond to the maximum outer diameter of the coupling protruding portion.

The fitting portion may include: a fitting slot into which the pillar member is fitted in a direction in which light is emitted; and a ring-shaped fitting rib which surrounds the fitting slot and extends in the direction in which the light is emitted, so that the fitting rib is closely attached and surrounds a coupling portion formed at one side of the pillar member.

The fitting portion may further include a catching rib which limits a width of the fitting slot and by which the coupling portion is caught, so that a position of the pillar member is fixed in a state in which the pillar member is fitted.

Advantageous Effects

According to the pillar structure for a biochip according to the present invention, which is configured as described above, the multiple fitting portions are provided on the substrate having a plate-shaped structure, the pillar members are detachably coupled to the fitting portions, the pillar members are pressed against the fitting portions so that the positions of the pillar members are fixed, and the light for enabling observation of the samples penetrate through (is projected into) the pillar members via the substrate, and as a result, it is possible to prevent distortion of images of the pillar portions, it is possible to analyze the samples without restriction on time and space since the pillar members may be separated from the substrate and then freely fitted with and disposed on another substrate again, and it is possible to individually analyze the samples disposed on the pillar members even though the samples are disposed on the same substrate.

Meanwhile, according to the present invention, the coupling portion of each of the pillar members has the coupling protruding portions, the width of the inlet formed in the space between the fitting portions into which the coupling protruding portions are fitted is smaller than the maximum outer diameter of the coupling protruding portion, and the width at the center of the space corresponds to the maximum outer diameter of the coupling protruding portion, such that coupling force between the pillar members and the substrate is increased, and fine motion of each of the pillar members is prevented, and as a result, more detailed images of the pillar members may be obtained to check the samples.

The effects of the present invention are not limited to the aforementioned effects, and other effects, which are not mentioned above, may be clearly understood by those skilled in the art from the following descriptions.

BEST MODE

Hereinafter, a pillar structure for a biochip according to an exemplary embodiment of the present invention will be described in detail with reference to the accompanying drawings.

Figure 1:
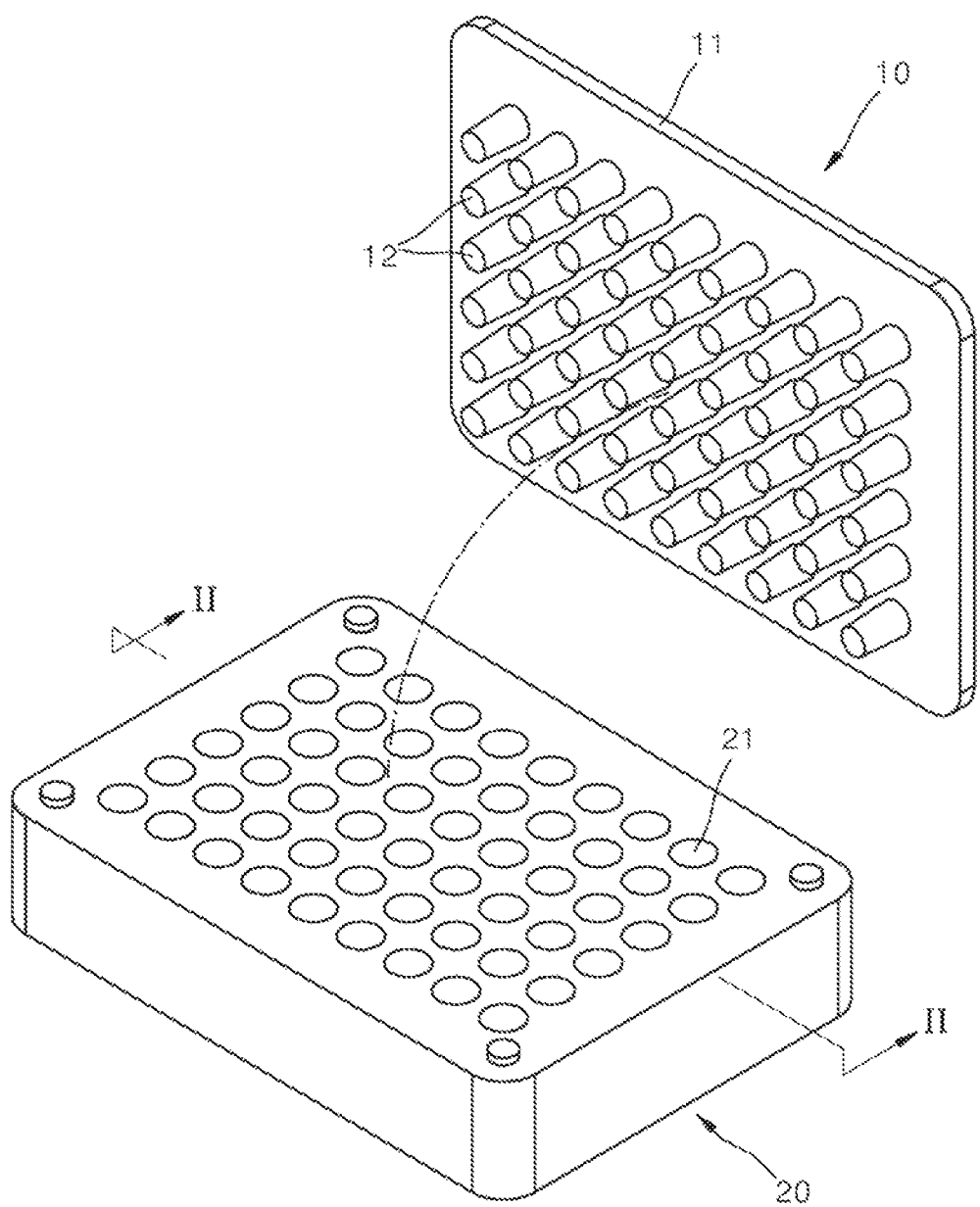
FIG. 1 is a perspective view for explaining a biochip in the related art.
Figure 2:
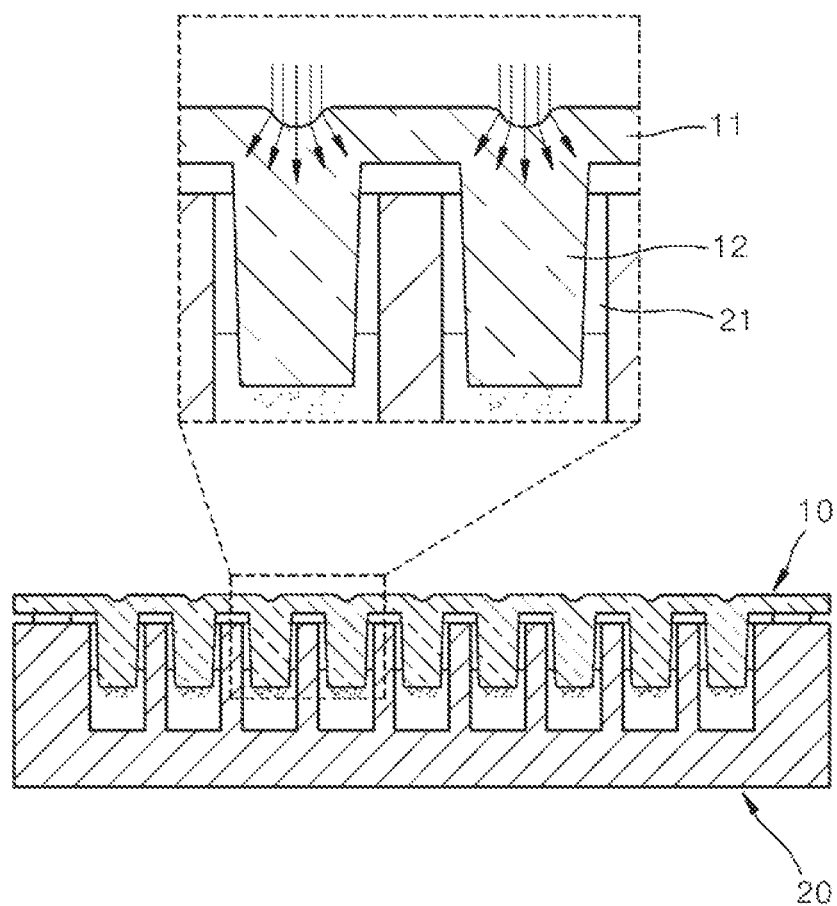
FIG. 2 is a cross-sectional view taken along line II-II in FIG. 1.
Figure 3:
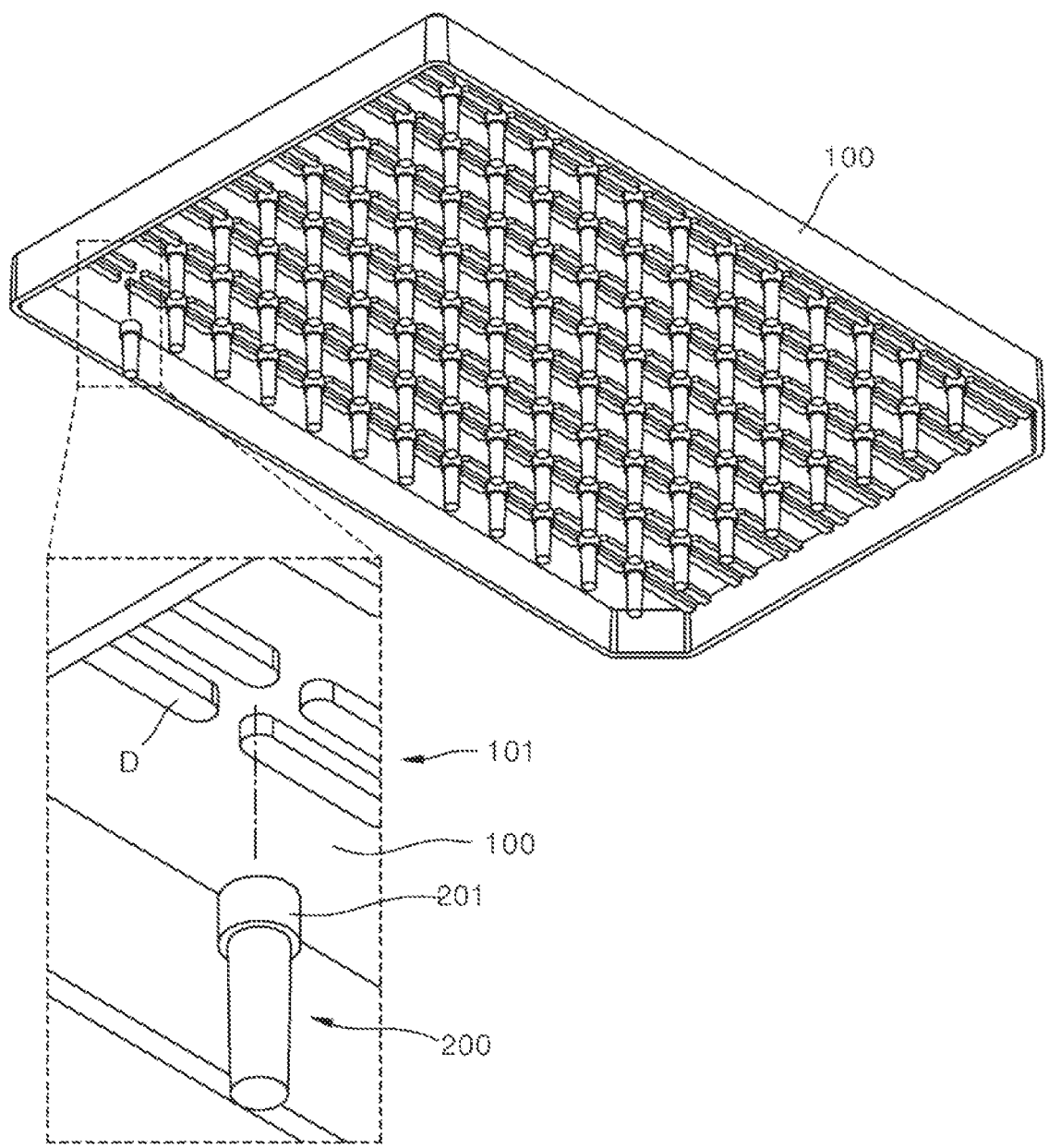
FIG. 3 is a perspective view illustrating a state in which pillar members and a substrate applied to an exemplary embodiment of the present invention are coupled to each other when viewed from a bottom side in order to explain a pillar structure for a biochip according to the exemplary embodiment of the present invention.
Figure 4:
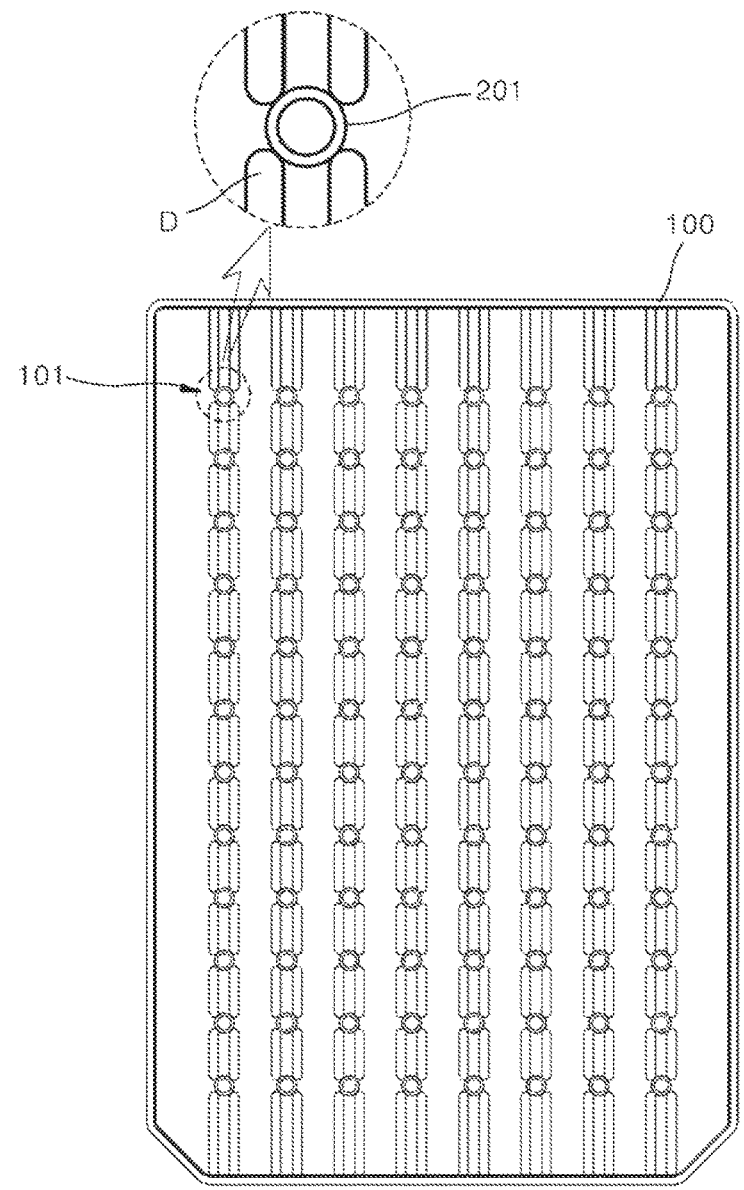
FIG. 4 is a bottom plan view for explaining a state in which the pillar members are coupled to the substrate applied to the exemplary embodiment of the present invention.
Figure 5:
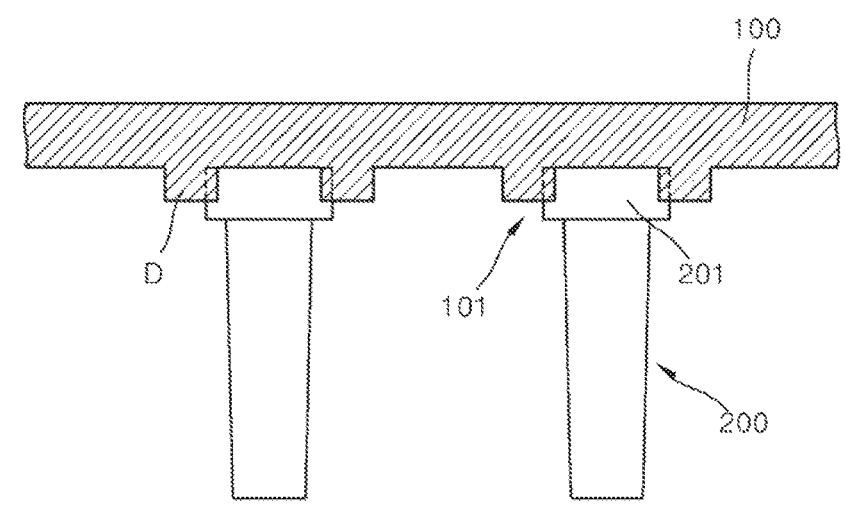
FIG. 5 is a side view of FIG. 4.

FIG. 3 is a perspective view illustrating a state in which pillar members a substrate applied to an exemplary embodiment of the present invention are coupled to each other when viewed from a bottom side in order to explain a pillar structure for a biochip according to the exemplary embodiment of the present invention, FIG. 4 is a bottom plan view for explaining a state in which the pillar members are coupled to the substrate applied to the exemplary embodiment of the present invention, and FIG. 5 is a side view of FIG. 4.

As illustrated in these drawings, the pillar structure for a biochip according to the exemplary embodiment of the present invention forms a biochip for analyzing a sample, which is a biological fine substance such as a cell, together with a well plate (not illustrated) that receives a culture solution, and the pillar structure includes a substrate 100 and multiple pillar members 200.

The substrate 100 may have a plate-shaped structure, and has multiple fitting portions 101 provided at predetermined intervals. The substrate 100 may be made of a resin composition material, with excellent light transmittance, such as polystyrene, maleic anhydride, fused-silica, quartz, polydimethylsiloxane (PDMS), or polymethylmethacrylate (PMMA), a polymeric material, or glass.

The substrate 100 is a base to which the pillar members 200 are coupled, and light, which passes through the substrate 100, may penetrate through the pillar members 200. The fitting portions 101, which are provided on the substrate 100, may be provided on a contact surface of the substrate 100 which is in contact with the pillar members 200, and the fitting portions 101 define spaces into which the pillar members 200 are fitted.

Since the substrate 100 has a plate shape and one side of each of the pillar members 200 is detachably coupled to the substrate 100, the pillar members 200 provided on the substrate 100 may be separated from the substrate 100 and then coupled to another substrate, and the pillar members 200 may be densely disposed on the substrate again, such that the samples may be individually analyzed without restriction on time and space and a degree of analysis integration may be improved.

Each of the fitting portions 101 is elongated in a longitudinal direction of the substrate 100, and the fitting portions 101 are arranged at intervals from one another. The fitting portions 101 are arranged in pairs, and the pillar members 200 may be fitted into the spaces formed between the fitting portions 101.

Meanwhile, the substrate 100 may include an adhesive layer (not illustrated) instead of the fitting portions 101. The adhesive layer allows the pillar members 200 to be adhesively attached to or detached from the substrate. The adhesive layer may be configured as a coating layer having an adhesive property on both surfaces thereof.

One side of each of the pillar members 200 is fitted into and coupled to the fitting portions 101, a sample is disposed at the other side of each of the pillar members 200, and the light passing through the substrate 100 penetrates through the pillar members 200. Each of the pillar members 200 is made of a material that allows light to penetrate therethrough, and the other side of the pillar member 200, on which the sample is disposed, is disposed in the culture solution provided in the well plate to culture the sample.

The pillar members 200 are disposed in the spaces formed by the fitting portions 101 and detachably coupled to the substrate 100. Meanwhile, in a case in which no fitting portion 101 is provided on the substrate 100, the pillar members 200 may be attached and coupled to the substrate 100 by the adhesive layer (not illustrated).

According to the pillar structure for a biochip according to the exemplary embodiment of the present invention, which is configured as described above, the multiple fitting portions 101 are provided on the substrate 100 having a plate-shaped structure, the pillar members 200 are detachably fitted into the fitting portions 101, the pillar members 200 are pressed against the fitting portions 101 so that the positions of the pillar members 200 are fixed, and the light for enabling observation of the samples penetrate through (is projected into) the pillar members 200 via the substrate 100, and as a result, it is possible to prevent distortion of images of the pillar portions, it is possible to analyze the samples without restriction on time and space since the pillar members may be separated from the substrate and then freely fitted with and disposed on another substrate again, and it is possible to individually analyze the samples disposed on the pillar members even though the samples are disposed on the same substrate.

Meanwhile, each of the pillar members 200 has a coupling portion 201 at one side thereof, and the coupling portion 201 is detachably fitted between the fitting portions 101 on the substrate 100. An outer diameter of the coupling portion 201 is greater than an outer diameter of the remaining portion of the pillar member except for the coupling portion 201 (the remaining portion including the other side at which the sample is disposed), such that coupling force between the coupling portion 201 and the substrate 100 may be increased.

In addition, since the pillar members 200 are detachably coupled to the substrate 100, it is possible to individually analyze the samples with a time difference because the samples may be moved in the same substrate 100, and it is possible to densely dispose the pillar members on another substrate again, such that a degree of analysis integration may be improved, and it is possible to individually analyze the samples disposed on the separate pillars even in the same substrate 100.

Further, the fitting portions 101 into which the pillar members 200 are fitted include multiple fitting protrusions D which are arranged at intervals around an outer circumferential surface of the coupling portion 201. Therefore, the fitting portions 101 may form fitting spaces that prevent the pillar members 200 from being separated from the substrate 100 after the pillar members 200 are coupled to the substrate 100, and enable the pillar members 200 separated from another substrate 100 to be disposed again.

The fitting protrusions D are provided at end portions of the fitting portions 101 that are in contact with the coupling portion 201 of the pillar member 200, and the fitting protrusions D protrude toward the outer circumferential surface of the coupling portion 201, thereby forming a coupling space to which the coupling portion 201 is coupled, and pressing the coupling portion 201. In this case, the coupling portion 201 of the pillar member 200 is interference-fitted into a disposition space formed by the fitting protrusions D.

The pillar structure for a biochip according to the exemplary embodiment of the present invention has been described above. Hereinafter, a pillar structure for a biochip according to another exemplary embodiment of the present invention will be described with reference to FIGS. 6 and 7.

Figure 6:
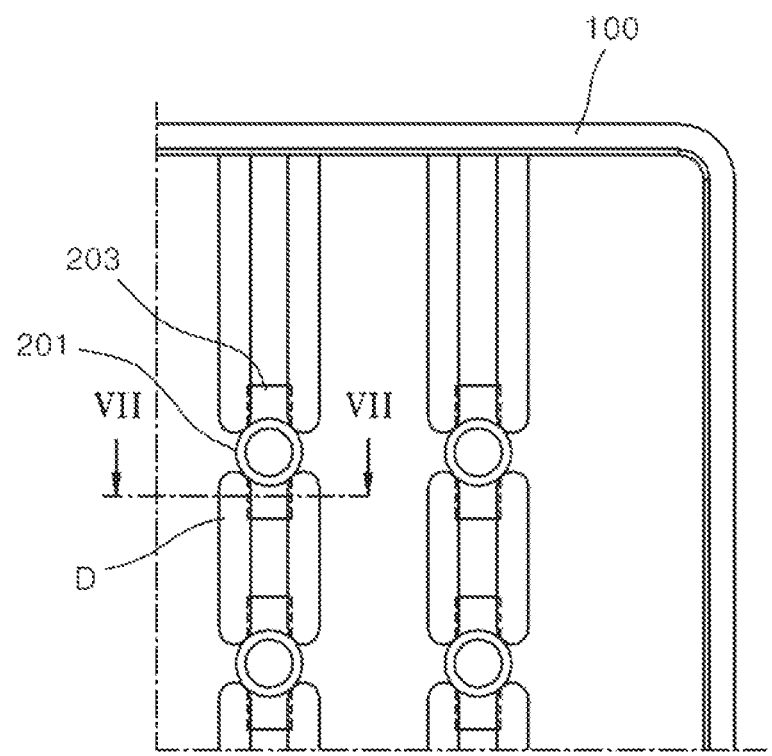
FIG. 6 is a bottom plan view for explaining a coupling protruding portion applied to a pillar structure for a biochip according to another exemplary embodiment of the present invention.
Figure 7:
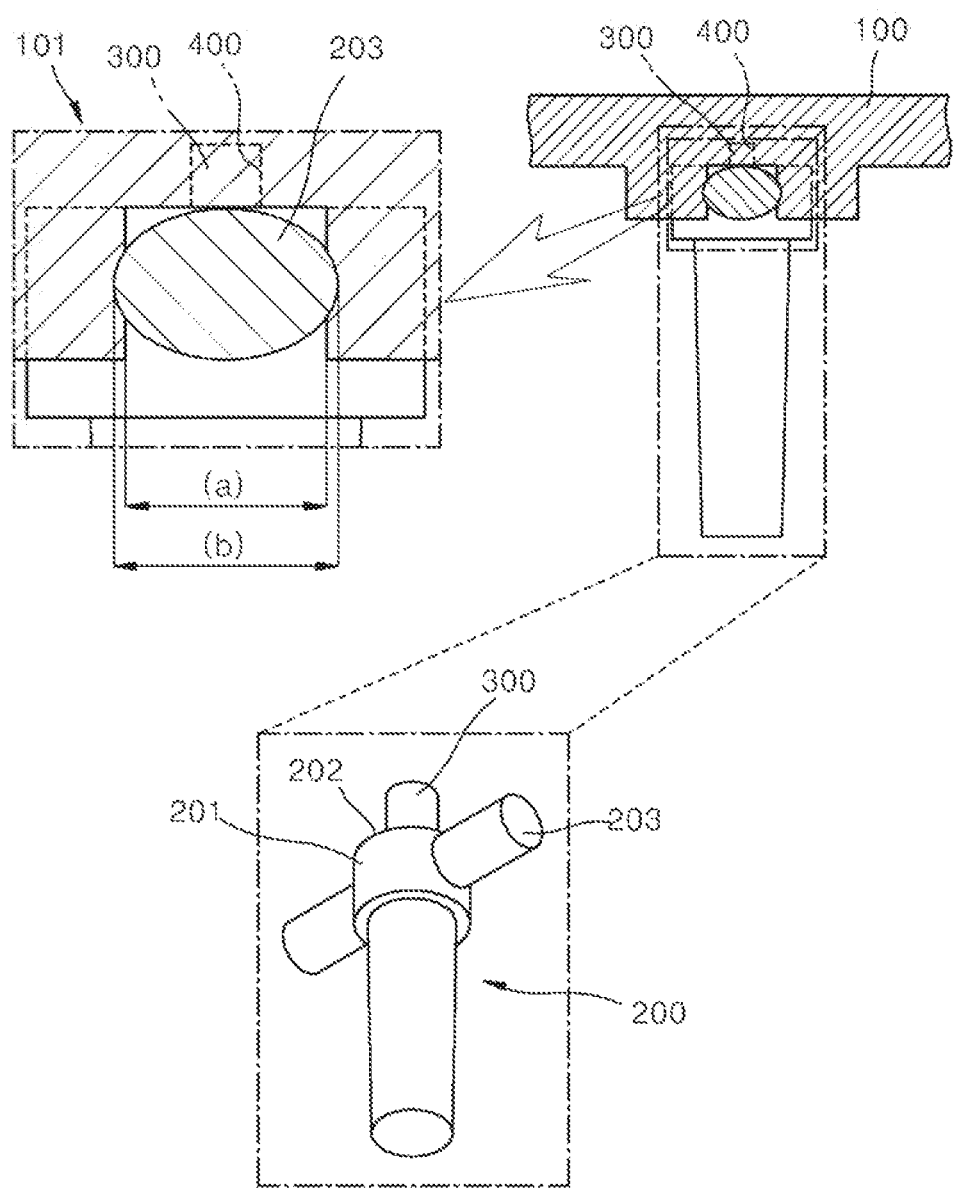
FIG. 7 is a cross-sectional view taken along line VII-VII in FIG. 6.

FIG. 6 is a bottom plan view for explaining a coupling protruding portion applied to the pillar structure for a biochip according to another exemplary embodiment of the present invention, and FIG. 7 is a cross-sectional view taken along line VII-VII in FIG. 6.

As illustrated in these drawings, most parts of the present exemplary embodiment are similar to the parts of the previous exemplary embodiment, but the present exemplary embodiment differs from the previous exemplary embodiment in terms of a structure of a coupling portion 201 formed on each pillar member 200.

That is, the coupling portion 201 of each of the pillar members 200 applied to the present exemplary embodiment includes coupling protruding portions 203. The coupling protruding portions 203 protrude outward in a radial direction of a light receiving portion 202 which is an end portion at one side of the coupling portion 201, and the coupling protruding portion 203 is fitted into a space between a pair of adjacent fitting portions 101 among the fitting portions 101.

Meanwhile, the coupling protruding portions 203 may be formed outward in the radial direction of the light receiving portion 202 in four directions (up, down, left, and right directions in FIG. 6), respectively, and the coupling protruding portions 203 may also be fitted into the spaces between the facing fitting protrusions D of the fitting portions 101, respectively.

A width a of an inlet of the space between the pair of fitting portions 101, where the coupling protruding portions 203 enter, may be smaller than a maximum outer diameter of the coupling protruding portion 203, and a width b at a center of the space, after each of the coupling protruding portion 203 enters, may correspond to the maximum outer diameter of the coupling protruding portion 203.

As described above, according to the present exemplary embodiment, the coupling portion 201 of each of the pillar members 200 has the coupling protruding portions 203, the width a of the inlet formed in the space between the fitting portions 101 into which the coupling protruding portions 203 are fitted is smaller than the maximum outer diameter of the coupling protruding portion 203, and the width b at the center of the space corresponds to the maximum outer diameter of the coupling protruding portion 203, such that coupling force between the pillar members 200 and the substrate 100 is increased, and fine motion of each of the pillar members 200 is prevented, and as a result, more detailed images of the pillar members may be obtained to check the samples.

The coupling portion 201 of each of the pillar members 200 may further include an insertion rib 300 on an end surface of the coupling portion 201 which is in contact with the substrate 100. In addition, insertion holes 400, into which the insertion ribs 300 of the pillar members 200 are inserted, may be provided in a contact surface of the substrate 100 which is in contact with the pillar members 200.

The insertion rib 300 is inserted into the insertion hole 400 in the substrate 100 when the pillar members 200 are fitted between the fitting portions 101 of the substrate 100, thereby enabling the pillar members 200 to be easily coupled to the substrate 100, and increasing coupling force when the pillar members 200 are coupled to the substrate 100.

The pillar structure for a biochip according to another exemplary embodiment of the present invention has been described above. Hereinafter, a pillar structure for a biochip according to still another exemplary embodiment of the present invention will be described with reference to FIGS. 8 and 9.

Figure 8:
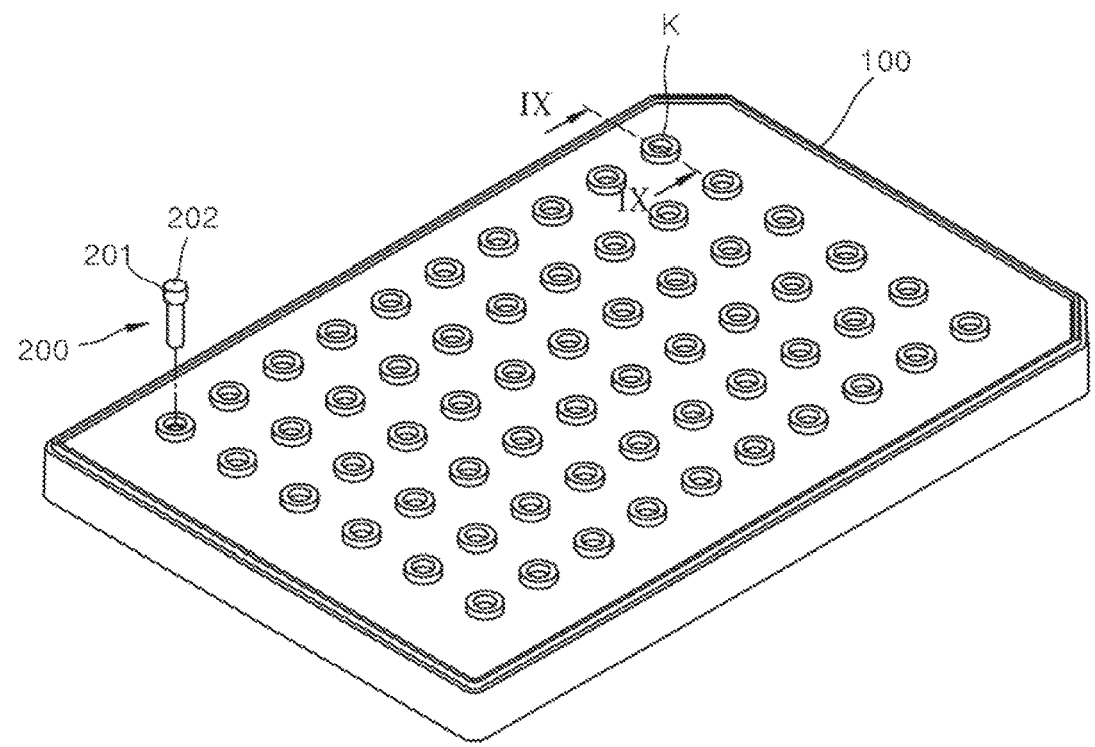
FIG. 8 is a perspective view for explaining a pillar structure for a biochip according to still another exemplary embodiment of the present invention.
Figure 9:
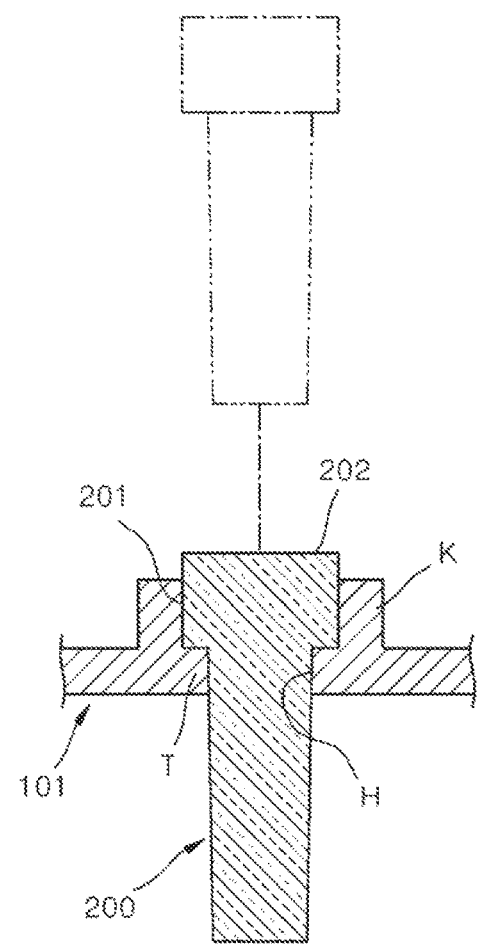
FIG. 9 is a cross-sectional view taken along line IX-IX in FIG. 8.

FIG. 8 is a perspective view for explaining a pillar structure for a biochip according to still another exemplary embodiment of the present invention, and FIG. 9 is a cross-sectional view taken along line IX-IX in FIG. 8.

As illustrated in these drawings, most parts of the present exemplary embodiment are similar to the parts of the previous exemplary embodiments, but the present exemplary embodiment differs from the previous exemplary embodiments in terms of structures of fitting portions 101 of a substrate 100 and a coupling relationship between the fitting portions 101 and pillar members 200.

That is, the fitting portions 101 applied to the present exemplary embodiment include fitting slots H which are disposed in the substrate 100 at intervals, and the pillar member 200 is fitted into the fitting slot H in a direction in which light is emitted. Further, each of the fitting portions 101 further includes a ring-shaped fitting rib K that surrounds the fitting slot H and extends in the direction in which light is emitted, such that the ring-shaped fitting rib K is closely attached to and surrounds the coupling portion 201 when the pillar member 200 is fitted into the fitting slot H.

Meanwhile, each of the fitting portions 101 may further include a catching rib T that limits a width of the fitting slot H. The catching rib T extends to face each other from an inner surface of the fitting slot H, such that the coupling portion 201 is caught by the catching rib T when the pillar member 200 is fitted into the fitting slot H. The catching rib T may extend along the inner surface of the fitting slot H, and the catching rib T may be formed in the form of a projection formed on the inner surface of the fitting slot H.

According to the present exemplary embodiment configured as described above, each of the pillar members 200 is fitted into the fitting slot H of the fitting portion 101 provided on the substrate 100, the fitting rib K has a ring shape surrounding the fitting slot H so that the fitting rib K is closely attached to and surrounds the coupling portion 201 of the pillar member 200, and the catching rib T extends along the inner surface of the fitting slot H so that the coupling portion 201 is caught by the catching rib T, such that the pillar members 200 may be easily coupled to the substrate 100, and coupling force between the coupled pillar members 200 and the substrate 100 is increased, thereby preventing motion of the pillar members when the substrate 100 is moved.

While the exemplary embodiments of the present invention have been described above, it is apparent that the present invention is not limited to the aforementioned exemplary embodiments but defined by the claims, and various modifications and alterations may be made by those skilled in the art to which the present invention pertains.

The invention claimed is:

1. A pillar structure for a biochip, which forms a biochip for analyzing a sample together with a well plate that receives a culture solution, the pillar structure comprising:
   a substrate which has a plate-shaped structure; and
   pillar members, each of which has one side detachably coupled to the substrate and the other side on which the sample is to be disposed,
   wherein each of the pillar members includes a coupling portion to be coupled to the substrate, the coupling portion is fitted with multiple fitting portions from among a plurality of fitting portions arranged on the substrate at predetermined intervals and the multiple fitting portions include four fitting protrusions arranged at intervals around an outer circumferential surface of the coupling portion so that a range of the coupling portion, which is exposed to light, is prevented from being reduced after the pillar members are coupled to the substrate, and
   wherein the pillar members are configured to allow light penetration for measuring the sample by a microscope.

2. A pillar structure for a biochip, which forms a biochip for analyzing a sample together with a well plate that receives a culture solution, the pillar structure comprising:
   a substrate which has a plate-shaped structure; and
   pillar members, each of which has one side detachably coupled to the substrate and the other side on which the sample is to be disposed,
   wherein each of the pillar members includes an insertion rib on an end of a coupling portion which is in contact with the substrate,
   wherein each of the pillar members includes a light receiving portion configured to receive light that passes through the substrate, and a pair of coupling protruding portions which extends outward in a radial direction of the light receiving portion and each coupling protruding portion among the pair is fitted into a space between a pair of adjacent fitting portions among fitting portions included on the substrate, a width of an inlet of the space, where each coupling protruding portion among the pair enters, is smaller than a maximum outer diameter of the corresponding coupling protruding portion, and a width at a center of the space after the corresponding coupling protruding portions enters corresponds to the maximum outer diameter of the corresponding coupling protruding portion, and
   wherein the pillar members are configured to allow light penetration for measuring the sample by a microscope.

3. A pillar structure for a biochip, which forms a biochip for analyzing a sample together with a well plate that receives a culture solution, the pillar structure comprising:
   a substrate which has a plate-shaped structure; and
   pillar members, each of which has one side detachably coupled to the substrate and the other side on which the sample is to be disposed,
   wherein each of the pillar members includes a coupling portion to be coupled to the substrate, the coupling portions are fitted with fitting portions arranged on the substrate at predetermined intervals,
   wherein each of the fitting portions includes:
   a fitting slot into which a corresponding pillar member, among the pillar members, is fitted in a direction in which light is emitted; and
   a ring-shaped fitting rib which surrounds the fitting slot and extends in the direction in which the light is emitted so that the ring-shaped fitting rib is closely attached and surrounds a coupling portion formed at one side of the corresponding pillar member so that a range of the coupling portion, which is exposed to light, is prevented from being reduced after the pillar members are coupled to the substrate, and
   wherein the pillar members are configured to allow light penetration for measuring the sample by a microscope.

4. The pillar structure of claim 3, wherein each of the fitting portions further includes a catching rib which limits a width of the fitting slot and by which the coupling portion is caught so that a position of the pillar member is fixed in a state in which the pillar member is fitted.

* * * * *